US010286744B2

(12) United States Patent
Kondo et al.

(10) Patent No.: US 10,286,744 B2
(45) Date of Patent: May 14, 2019

(54) VEHICLE HEIGHT ADJUSTMENT DEVICE

(71) Applicant: AISIN SEIKI KABUSHIKI KAISHA, Kariya-shi, Aichi-ken (JP)

(72) Inventors: Yusuke Kondo, Nagoya (JP); Atsuto Ogino, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/644,057

(22) Filed: Jul. 7, 2017

(65) Prior Publication Data

US 2018/0029432 A1 Feb. 1, 2018

(30) Foreign Application Priority Data

Jul. 27, 2016 (JP) ................. 2016-147583

(51) Int. Cl.
*B60G 17/016* (2006.01)
*B60G 11/26* (2006.01)
(Continued)

(52) U.S. Cl.
CPC ..... *B60G 17/0162* (2013.01); *B60G 17/0155* (2013.01); *B60G 17/0565* (2013.01); *B60G 2202/152* (2013.01); *B60G 2400/0511* (2013.01); *B60G 2400/0512* (2013.01); *B60G 2400/104* (2013.01); *B60G 2400/106* (2013.01); *B60G 2400/208* (2013.01); *B60G 2400/2042* (2013.01); *B60G 2400/252* (2013.01);
(Continued)

(58) Field of Classification Search
CPC ............ B60G 17/01557; B60G 17/015; B60G 17/016; B60G 17/0162; B60G 17/0523; B60G 17/017; B60G 11/26; B60Q 1/10; F16F 5/00; G06F 17/00
See application file for complete search history.

(56) References Cited

U.S. PATENT DOCUMENTS 4,640,526 A * 2/1987 Tanaka ................. B60G 17/017
280/5.508
5,515,274 A * 5/1996 Mine .................. B60G 17/0162
280/5.508

(Continued)

FOREIGN PATENT DOCUMENTS

JP 3111504 B2 11/2000
JP 4111036 B2 7/2008
(Continued)

*Primary Examiner* — Yuri Kan
(74) *Attorney, Agent, or Firm* — Buchanan Ingersoll & Rooney PC

(57) ABSTRACT

A vehicle height adjustment device includes: a pressure tank capable of storing air in a compression state; a plurality of vehicle height adjustment units that are provided in correspondence with wheels of a vehicle and individually adjust vehicle heights at the respective wheels by supplying the air from the pressure tank or returning the air to the pressure tank; an information acquisition unit that acquires turn route information during travel of the vehicle; and a control unit that raises the vehicle height at the vehicle height adjustment unit on a turn outer side more than the vehicle height at the vehicle height adjustment unit on a turn inner side such that the vehicle takes a tilt posture on the basis of the turn route information when the vehicle turns.

14 Claims, 4 Drawing Sheets

(51) Int. Cl.
*F16F 5/00* (2006.01)
*G06F 17/00* (2019.01)
*B60G 17/015* (2006.01)
*B60G 17/056* (2006.01)

(52) U.S. Cl.
CPC ...... *B60G 2400/41* (2013.01); *B60G 2400/50* (2013.01); *B60G 2400/51* (2013.01); *B60G 2500/201* (2013.01); *B60G 2500/202* (2013.01); *B60G 2500/205* (2013.01); *B60G 2500/30* (2013.01); *B60G 2500/326* (2013.01); *B60G 2800/012* (2013.01)

(56) References Cited

U.S. PATENT DOCUMENTS

| | | | | |
|---|---|---|---|---|
| 6,116,618 A * | 9/2000 | Shono | ............ | B60G 17/016 |
| | | | | 280/5.501 |
| 6,665,597 B1 * | 12/2003 | Hanser | ............ | B60G 17/0155 |
| | | | | 280/5.514 |
| 6,726,189 B2 * | 4/2004 | Folchert | ............ | B60G 17/0523 |
| | | | | 267/64.16 |
| 7,053,762 B2 * | 5/2006 | Sakai | ............ | B60Q 1/10 |
| | | | | 340/458 |
| 7,761,205 B2 * | 7/2010 | Onuma | ............ | B60G 17/015 |
| | | | | 280/6.15 |
| 2004/0105272 A1 * | 6/2004 | Toda | ............ | B60Q 1/10 |
| | | | | 362/465 |

FOREIGN PATENT DOCUMENTS

JP 4184687 B2 11/2008
JP 2013-154834 A 8/2013

* cited by examiner

VEHICLE HEIGHT ADJUSTMENT DEVICE

CROSS REFERENCE TO RELATED APPLICATIONS

This application is based on and claims priority under 35 U.S.C. § 119 to Japanese Patent Application 2016-147583, filed on Jul. 27, 2016, the entire contents of which are incorporated herein by reference.

TECHNICAL FIELD

This disclosure relates to a vehicle height adjustment device.

BACKGROUND DISCUSSION

There is a vehicle having a suspension provided with an air spring or the like in the related art. In addition, there is a vehicle in which a vehicle height adjustment device is mounted that uses the air spring. In general, the vehicle height adjustment device performs a vehicle height adjustment, for example, facilitates boarding and alighting operations or loading and unloading operations of cargo on condition that a vehicle stops. In addition, there is also a case where a vehicle height is adjusted according to a state of a travel road surface. In addition, a technology for providing more stable turn travel performance by executing a vehicle height adjustment during turn travel is proposed.

Examples of related art include JP2013-154834A and Japanese Patent No. 4111036.

However, there is room for improvement of travel stability, drive feeling, or the like in addition to a control width of a vehicle height and a response speed with respect to a vehicle height control at the time of turning.

Thus, a need exists for a vehicle height adjustment device which is not susceptible to the drawback mentioned above.

SUMMARY

A vehicle height adjustment device according to an aspect of this disclosure includes, for example, a pressure tank capable of storing air in a compression state; a plurality of vehicle height adjustment units that are provided in correspondence with wheels of a vehicle and individually adjust vehicle heights at the respective wheels by supplying the air from the pressure tank or returning the air to the pressure tank; an information acquisition unit that acquires turn route information during travel of the vehicle; and a control unit that raises the vehicle height at the vehicle height adjustment unit on a turn outer side more than the vehicle height at the vehicle height adjustment unit on a turn inner side such that the vehicle takes a tilt posture on the basis of the turn route information when the vehicle turns.

A vehicle height adjustment device according to another aspect of this disclosure includes, for example, a plurality of vehicle height adjustment units that are provided in correspondence with wheels of a vehicle and individually adjust vehicle heights at the respective wheels; an information acquisition unit that acquires current position information of the vehicle; a storage unit that holds a position on a map where the vehicle turns and a tilt posture of the vehicle in the position in association with each other; and a control unit that acquires the tilt posture corresponding to the current position information from the storage unit when the vehicle turns and raises a vehicle height at the vehicle height adjustment unit on a turn outer side more than a vehicle height at the vehicle height adjustment unit on a turn inner side such that the vehicle takes the tilt posture.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments are disclosed. Configurations of the embodiments described below and actions and results (effects) brought about by the configurations are merely examples. This disclosure can also be realized by other than the configurations disclosed in the following embodiments and can obtain various effects (including derivative effects) obtained by a basic configuration.

Figure 1:
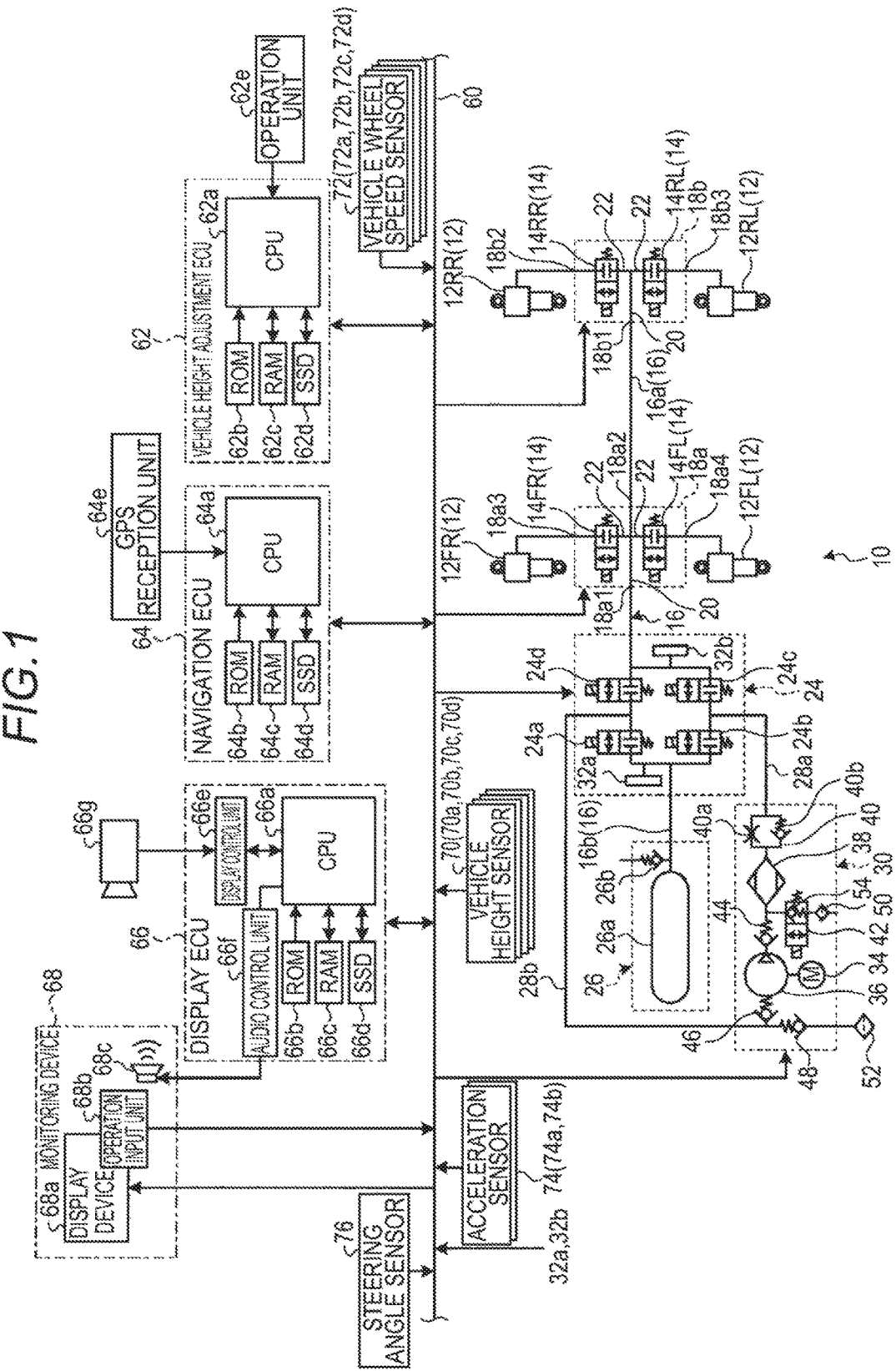
FIG. 1 is a block diagram illustrating an example of a vehicle height adjustment system including a vehicle height adjustment device according to an embodiment.

FIG. 1 is a diagram illustrating a configuration of a vehicle height adjustment system 10 including a vehicle height adjustment device according to an embodiment. The vehicle height adjustment system 10 according to the present embodiment can perform vehicle height adjustment for automatically improving travel stability and drive feeling when a vehicle performs turn travel. In addition, the vehicle height adjustment system 10 can perform the vehicle height adjustment for facilitating boarding and alighting of a passenger or loading and unloading of cargo when the vehicle is stopped, or making the vehicle height suitable for a road surface state (regular ground road, irregular ground road, or the like) of a region on which a vehicle travels from now, by, for example, a switch operation or the like.

Air springs 12FR, 12FL, 12RR, and 12RL (hereinafter, the air springs may be simply referred to as "air springs 12" in a case where each air spring is not distinguished) which function as vehicle height adjustment units are respectively connected to wheels of a vehicle which are not illustrated. Each air spring 12 changes suspension states of the wheels with respect to a body of the vehicle in accordance with plumbing of working fluid (for example, air). In addition, the air spring has a function of absorbing vibration of the vehicle by using elasticity of air sealed in the air spring 12 in a compressed state. The air springs 12FR and 12FL may be referred to as front wheel vehicle height adjustment units in some cases. In addition, the air springs 12RR and 12RL may be referred to as rear wheel vehicle height adjustment units in some cases. A known structure can be used for the air spring 12. Since the air spring 12 utilizes elasticity of air, the air spring easily absorb fine vibration as compared with a metal spring. In addition, by controlling air pressure, it is possible to maintain a constant vehicle height, to adjust the vehicle height to a desired height, and to change a spring constant to a desired value.

The air springs 12FR and 12FL which are the front wheel vehicle height adjustment units are connected to a main flow path 16 through which air flows through vehicle height adjustment valves 14FR and 14FL. In the same manner, the air springs 12RR and 12RL which are the rear wheel vehicle height adjustment units are connected to the main flow path 16 through which air flows through vehicle height adjustment valves 14RR and 14RL. In a case where the vehicle height adjustment valves 14FR, 14FL, 14RR, and 14RL are not distinguished, they may be simply referred to as "vehicle height adjustment valves 14" in some cases. In addition, in the present embodiment, the air spring 12 and the vehicle height adjustment valve 14 may be collectively referred to as a vehicle height adjustment unit in some cases.

In the present embodiment, the vehicle height adjustment valves 14FR and 14FL are embedded and disposed in a flow path block formed of, for example, a metal or a resin to configure a front wheel valve unit 18a. In the same manner, the vehicle height adjustment valves 14RR and 14RL are embedded and disposed in the flow path block to configure a rear wheel valve unit 18b. In another embodiment, each of the vehicle height adjustment valves 14 may be individually disposed. In this case, freedom degree of layout of each vehicle height adjustment valve 14 is improved. In addition, the four vehicle height adjustment valves 14 may be integrated into a unit. In this case, the integration into a unit can contribute to reduction of the number of units.

As illustrated in FIG. 1, by configuring the front wheel valve unit 18a and the rear wheel valve unit 18b as separate units, the front wheel valve unit 18a can be disposed on a front wheel side. As a result, a length of a flow path pipe from the front wheel valve unit 18a to each air spring 12 on the front wheel side can be reduced as compared with a case where all the vehicle height adjustment valves 14 are collected into one unit. In the same manner, the rear wheel valve unit 18b can be disposed on a rear wheel side, a length of a flow path pipe from the rear wheel valve unit 18b to each air spring 12 on the rear wheel side can be reduced as compared with a case where all the vehicle height adjustment valves 14 are collected into one unit. As the result, the flow path pipe is easily disposed, and risk of breakage or the like of the flow path pipe can be reduced by shortening the length of the flow path pipe.

A first port 18a1 to which the main flow path 16 is connected is formed on one end face of the front wheel valve unit 18a, and a main flow path channel 20 having the first port 18a1 defined as one end and a second port 18a2 defined as the other end is formed to penetrate an inside of the front wheel valve unit 18a. Two sub flow path channels 22 branch from the main flow path channel 20 in the inside of the front wheel valve unit 18a. One end of the vehicle height adjustment valve 14FR is connected to one of the sub flow path channels 22 and the other end of the vehicle height adjustment valve 14FR is connected to the air spring 12FR through a third port 18a3. In the same manner, one end of the vehicle height adjustment valve 14FL is connected to one of the sub flow path channels 22 and the other end of the vehicle height adjustment valve 14FL is connected to the air spring 12FL through a fourth port 18a4.

A communication main flow path 16a (main flow path 16) is connected to the second port 18a2. The communication main flow path 16a is connected to the first port 18b1 of the rear wheel valve unit 18b. The main flow path channel 20 having the first port 18b1 defined as one end is formed inside the rear wheel valve unit 18b. The two sub flow path channels 22 branch from the main flow path channel 20 also inside the rear wheel valve unit 18b. One end of the vehicle height adjustment valve 14RR is connected to one of the sub flow path channels 22, and the other end of the vehicle height adjustment valve 14RR is connected to the air spring 12RR through the second port 18b2. One end of the vehicle height adjustment valve 14RL is connected to the other one of the sub flow path channels 22, and the other end of the vehicle height adjustment valve 14RL is connected to the air spring 12RL through a third port 18b3.

In a case of FIG. 1, an example is used in which the front wheel valve unit 18a uses a 4-port type and the rear wheel valve unit 18b uses a 3-port type, but, for example, the same valve unit of the 4-port type can also be used on the front wheel side and the rear wheel side. In a case where the 4-port type which is the same as in the front wheel valve unit 18a is used as the rear wheel valve unit 18b, a port corresponding to the second port 18a2 is sealed by a plug cap (blind plug). This case can contribute to reduction of component types, reduction of design cost, and the like according to commonality of valve units.

Each of the vehicle height adjustment valves 14 (14FR, 14FL, 14RR, 14RL) can use an opening/closing valve of the same type, and has, for example, a solenoid that is turned on or off and a spring. Any control valve can also be used by a normally closed type electromagnetic control valve which is in a closed state in a case where the solenoid is in a turn-off state.

The main flow path 16 is connected to a pressure tank 26 capable of storing air in a compressed state through a circuit valve block 24 and a tank connection main flow path 16b. The circuit valve block 24 is connected to the outflow side of a compressor unit 30 through a compressor outflow path 28a. In addition, the circuit valve block 24 is connected to an inflow side of the compressor unit 30 through a compressor inflow path 28b. The circuit valve block 24 is configured as a valve body block including a plurality of opening/closing valves, for example, four opening/closing valves. Specifically, the circuit valve block 24 is configured by a first opening/closing valve 24a, a second opening/closing valve 24b, a third opening/closing valve 24c, and a fourth opening/closing valve 24d. One end side of each of the first opening/closing valve 24a and the second opening/closing valve 24b is connected to a pressure tank 26 through the tank connection main flow path 16b (main flow path 16). One end side of the third opening/closing valve 24c is connected to an outflow side of the compressor unit 30 through a compressor outflow path 28a, and is connected to the other end side of the second opening/closing valve 24b. In addition, the other end side of the third opening/closing valve 24c is connected to the air spring 12 side (vehicle height adjustment unit side, front wheel valve unit 18a side). One end side of the fourth opening/closing valve 24d is connected to the inflow side of the compressor unit 30 through the compressor inflow path 28b and is connected to the other end side of the first opening/closing valve 24a. In addition, the other end side of the fourth opening/closing valve 24d is connected to the air spring 12 side (vehicle height adjustment unit side, front wheel valve unit 18a side).

The first opening/closing valve 24a, the second opening/closing valve 24b, the third opening/closing valve 24c, and the fourth opening/closing valve 24d which are included in the circuit valve block 24 can use the same type opening/closing valve, and have, for example, a solenoid which is turned on or off and a spring. Any opening/closing valve can also be used by a normally closed type electromagnetic control valve which is in a closed state in a case where the solenoid is in a turn-off state.

The circuit valve block 24 includes a first pressure sensor 32a for detecting pressure on a pressure tank 26 side and a second pressure sensor 32b for detecting pressure on an air spring 12 (vehicle height adjustment unit side, front wheel valve unit 18a side). The first pressure sensor 32a can accurately detect a static pressure on the pressure tank 26 side, for example, in a case where the first opening/closing valve 24a and the second opening/closing valve 24b are closed. In addition, in a case where at least one of the first opening/closing valve 24a and the second opening/closing valve 24b is open and air flows, the dynamic pressure on the pressure tank 26 side can be detected. In the same manner, the second pressure sensor 32b can measure the static pressure on the air spring 12 side, if the third opening/closing valve 24c and the fourth opening/closing valve 24d are in a close state and at least one of the vehicle height adjustment valve 14FR and the vehicle height adjustment valve 14FL on the front wheel side is in an open state. In addition, the second pressure sensor 32b brings the third opening/closing valve 24c and the fourth opening/closing valve 24d into a close state, brings the vehicle height adjustment valve 14RR and the vehicle height adjustment valve 14RL into a close state, and brings one of the vehicle height adjustment valve 14FR and the vehicle height adjustment valve 14FL into an open state. As a result, the static pressure of one of the air spring 12FR and the air spring 12FL on the front wheel side can be detected. In addition, by setting both the vehicle height adjustment valve 14FR and the vehicle height adjustment valve 14FL in an open state, an average static pressure of both the air springs 12FR and 12FL can be detected. In addition, the second pressure sensor 32b brings the third opening/closing valve 24c and the fourth opening/closing valve 24d in a close state, brings the vehicle height adjustment valve 14FR and the vehicle height adjustment valve 14FL into a close state, and brings one of the vehicle height adjustment valve 14RR and the vehicle height adjustment valve 14RL into an open state. As a result, the static pressure of any one of the air spring 12RR and the air spring 12RL on the rear wheel side can be detected. In addition, by setting both the vehicle height adjustment valve 14RR and the vehicle height adjustment valve 14RL in an open state, the average static pressure of both the air springs 12RR and 12RL can be detected. Furthermore, the second pressure sensor 32b brings the third opening/closing valve 24c and the fourth opening/closing valve 24d into a close state, and brings the vehicle height adjustment valve 14FR, the vehicle height adjustment valve 14FL, the vehicle height adjustment valve 14RR, and the vehicle height adjustment valve 14RL into an open state. As a result, the static pressure of all the air springs 12FR, 12FL, 12RR, and 12RL corresponding to all the wheels can be detected. In addition, in a case where the third opening/closing valve 24c or the fourth opening/closing valve 24d is in an open state, the second pressure sensor 32b can measure the dynamic pressure on the air spring 12 side (the vehicle height adjustment unit side, the front wheel valve unit 18a side and the rear wheel valve unit 18b side).

As such, the first pressure sensor 32a can detect the pressure (static pressure or dynamic pressure) on an upstream side (for example, pressure tank 26 side) of the circuit valve block 24, and the second pressure sensor 32b can detect the pressure (static pressure or dynamic pressure) on a downstream side (for example, air spring 12 side) of the circuit valve block 24. As will be described below, vehicle height adjustment can be performed by causing air to flow from the pressure tank 26 side to the air spring 12 side by a pressure difference (differential pressure) between the pressure on the pressure tank 26 side and the pressure on the air spring 12 side. In a case where the pressure difference between the pressure tank 26 side and the air spring 12 side is small, air flow for adjusting the vehicle height adjustment may not be sufficiently performed. In this case, it is possible to perform a drive control of each air spring 12 by driving the compressor unit 30 to make the air forcibly flow.

The pressure tank 26 is made of, for example, a metal or a resin and has pressure resistance and capacitance enough to withstand the pressure generated in a flow path system including times when vehicle height adjustment control is performed and is not performed by the air spring 12. In addition, the pressure tank 26 includes a relief valve 26b for reducing the pressure in a case where the internal pressure of the tank main body 26a is higher than or equal to a set pressure (pressure set in advance by testing or the like) due to some cause.

The compressor unit 30 mainly includes a compressor 36 driven by a motor 34, a dryer 38, a throttle mechanism 40 including an orifice 40a and a check valve 40b. In addition to this, FIG. 1 illustrates an example in which a relief valve 42, check valves 44, 46, and 48, filters 50, 52, and the like are included.

In a case where a pressure difference between the pressure tank 26 side and the air spring 12 side at the time of vehicle height raising control is less than or equal to a predetermined value (a value set in advance by testing or the like), or in a case where air is pumped up (returned) from air spring 12 side to the pressure tank 26 at the time of vehicle height dropping control, the compressor unit 30 operates the compressor 36 by the motor 34 to forcibly feed air. The vehicle height adjustment system 10 according to the present embodiment is a system (vehicle height adjustment system of a close type rapid vehicle height adjustment type) of a closed type in which the vehicle height adjustment is performed by moving air (air sealed from the beginning) in a route between the pressure tank 26 side and the air spring 12 side. Hence, it is possible to rapidly expand the air spring 12, and to realize a quick vehicle height control according to situations even during travel. In addition, basically, it is not necessary to take external air into the system and it can be regarded that there is no environmental change such as humidity variation, in a case of a closed type device. Hence, basically, the dryer 38 or the throttle mechanism 40 can be omitted in a case of a closed type system. However, there is a case where air in the system is leaked to the outside due to some cause. In such a case, atmosphere (external air) is taken in from the outside through the filter 52 and the check valve 48 to replenish the air in the system. In this case, the atmosphere (external air) may contain moisture (humid air) which is disadvantageous to configuration components in the vehicle height adjustment system 10. Accordingly, the vehicle height adjustment system 10 illustrated in FIG. 1 has the dryer 38 for removing a predetermined amount of humidity of the taken-in atmosphere or the throttle mechanism 40 for adjusting a passing speed of the atmosphere in the dryer 38 which are provided on the downstream side of the compressor 36. The compressor unit 30 includes a relief valve 42 so as to reduce pressure in a case where the pressure inside the vehicle height adjustment system 10 exceeds a limit pressure due to some reason. The relief valve 42 can be, for example, a normally close type electromagnetic control valve having a solenoid that is turned on or off and a spring, which is in a close state in a case where the solenoid is in a non-conduction state. The relief valve 42 according to the present embodiment does not maintain the close state at the time of non-conduction in any case, and includes a check valve 54 which allows air to flow in an atmosphere open direction in a case where the pressure in the vehicle height adjustment system 10 exceeds the limit pressure (the pressure set in advance by testing or the like). For example, in a case where abnormality occurs and the internal pressure of the vehicle height adjustment system 10 exceeds the limit pressure, the valve open state reversed against urging force of the check valve 54 starts, and the pressure is reduced such that the pressure is automatically set to be lower than or equal to the limit pressure. The relief valve 42 can also move to the valve open state in response to a control signal from a vehicle height adjustment ECU which will be described below, and thereby, it is possible to reduce the internal pressure of the vehicle height adjustment system 10 regardless of the limit pressure.

The front wheel valve unit 18a, the rear wheel valve unit 18b, the circuit valve block 24, the compressor unit 30, and the like, which are configured in this way, are controlled in response to the control signal transferred from a vehicle height adjustment electronic control unit (ECU) 62 electrically connected through an in-vehicle network 60. The in-vehicle network 60 is configured as, for example, a controller area network (CAN). In addition to the vehicle height adjustment ECU 62, a control unit such as a navigation ECU 64, and a display ECU 66, a monitoring device 68, and the like are electrically connected to the in-vehicle network 60 to exchange control signals or data (information) with each other.

The vehicle height adjustment ECU 62 performs an opening/closing control of the vehicle height adjustment valves 14FR, 14FL, 14RR, and 14RL, the first opening/closing valve 24a, the second opening/closing valve 24b, the third opening/closing valve 24c, the fourth opening/closing valve 24d, the relief valve 42, and the like, or a drive control of the motor 34 based on detection results of the vehicle height sensor 70 that detects vehicle height adjustment requirements obtained through the in-vehicle network 60 or an expansion/contraction (vehicle height) state of each air spring 12, or detection results of the first pressure sensor 32a and the second pressure sensor 32b. The vehicle height adjustment ECU 62 includes a central processing unit (CPU) 62a, and a storage device (storage unit), such as a read only memory (ROM) 62b, a random access memory (RAM) 62c, and a solid state drive (SSD) (flash memory) 62d. The CPU 62a reads a program installed and stored in a nonvolatile storage device such as the ROM 62b, performs arithmetic processing according to the program, thereby, determining a control amount of each of the valves and the motors described above, performing an expansion/contraction control of each air spring 12, and performing a vehicle height control of each wheel, based on the control amount. Detailed configuration and function of the CPU 62a will be described below. The RAM 62c temporarily stores various kinds of data used for the calculation in the CPU 62a. In addition, the SSD 62d is a rewritable nonvolatile storage unit, and can store data even in a case where the power of the vehicle height adjustment ECU 62 is disconnected. By operating the operation unit 62e, vehicle height adjustment can be manually performed. The operation unit 62e is, for example, a push button, a toggle switch, a rotary switch, or the like, and manually switches the vehicle height on a regular ground road and an irregular ground road, performs the vehicle height adjustment depending on preference of a passenger, or is used in a case where a vehicle height is adjusted to be suitable for boarding/alighting or loading/unloading of cargo. In addition, switching between manual adjustment and automatic adjustment of the vehicle height may also be performed by using the operation unit 62e.

The navigation ECU 64 includes a storage device (storage unit) such as a CPU 64a, a ROM 64b, a RAM 64c, and an SSD 64d. The CPU 64a reads a program installed and stored in a nonvolatile storage device such as the ROM 64b, performs arithmetic processing according to the program, thereby, performing acquisition of a current position of a host vehicle on the basis of the GPS signal acquired through a GPS reception unit 64e, calculation of a movement route from the current position to a destination, guidance of facilities around the movement route, leading to the destination, and the like. The RAM 64c temporarily stores various data used in the calculation in the CPU 64a. In addition, the SSD 64d is a rewritable nonvolatile storage unit, and can store the data even in a case where power of the navigation ECU 64 is disconnected. Map information used for navigation is held in, for example, the SSD 64d, and is read to be used at the time of processing navigation or displaying a route, and is appropriately updated to provide appropriate map information. In addition, as will be described below, by using the current position of the host vehicle acquired by the navigation ECU 64 and the map information, the vehicle height adjustment ECU 62 can acquire a start position and an end position of the vehicle height control at the time of turn travel.

The display ECU 66 performs image processing displayed on a display device 68a of the monitoring device 68. The display device 68a is, for example, a liquid crystal display (LCD), an organic electroluminescent display (OLED), or the like which are disposed in the periphery of a seat of a driver in a vehicle, for example, a dashboard or the like. The display device 68a is covered with a transparent operation input unit 68b such as a touch panel. An occupant can visually recognize an image displayed on a display screen of the display device 68a through the operation input unit 68b. In addition, the occupant can perform an operation input by touching, pressing, or moving the operation input unit 68b with a finger or the like at a position corresponding to the image displayed on the display screen of the display device 68a. An audio output device 68c is, for example, a speaker.

The display ECU 66 includes a CPU 66a, a ROM 66b, a RAM 66c, an SSD 66d, a display control unit 66e, an audio control unit 66f, and the like. The CPU 66a performs image processing related to an image displayed in, for example, the display device 68a. In addition, as will be described below, in a case where the vehicle height adjustment ECU 62 determines start or end of a vehicle height adjustment based on the captured image data acquired by an image capturing unit 66g, information that can be used by the vehicle height adjustment ECU 62 is generated. The CPU 66a can read a program installed and stored in a nonvolatile storage device such as the ROM 66b and can execute arithmetic processing according to the program. The RAM 66c temporarily stores various data used in the calculation in the CPU 66a. The SSD 66d is a rewritable nonvolatile storage unit, and can store data even in a case where power of the display ECU 66 is disconnected. In addition, the display control unit 66e mainly performs combination or the like of image data displayed in the display device 68a, among the arithmetic processing in the display ECU 66. In addition, the audio control unit 66f mainly performs processing of the voice data output from the audio output device 68c among the arithmetic processing in the display ECU 66. The monitoring device 68 may be used as, for example, a navigation system or an audio system.

The CPUs 62a, 64a, and 66a, the ROMs 62b, 64b, and 66b, the RAMs 62c, 64c, and 66c, and the like in the vehicle height adjustment ECU 62, the navigation ECU 64, and the display ECU 66 can be integrated in the same package. In addition, each ECU may be configured to use other logical arithmetic processors such as a digital signal processor (DSP), logic circuits, or the like instead of the CPU. In addition, a hard disk drive (HDD) may be provided instead of the SSDs 62d, 64d, and 66d, and the SSD or the HDD may be provided separately from the ECU.

In addition to this, various sensors, such as a vehicle height sensor 70, a vehicle wheel speed sensor 72, an acceleration sensor 74, a steering angle sensor 76 and the like are electrically connected to the in-vehicle network 60, and a signal is transmitted and received.

Each of the vehicle height sensors 70 (70a, 70b, 70c, 70d) is connected to a suspension arm (lower arm and the like), which configures a suspension connecting a body and the wheel, which are not illustrated, for each wheel, and detects the amount of vertical displacement between the suspension arm and the body. In addition, a type which directly measures a distance to a road surface by using an ultrasonic wave or laser may be used as the vehicle height sensor 70. The vehicle height adjustment ECU 62 controls the front wheel valve unit 18a, the rear wheel valve unit 18b, the circuit valve block 24, the compressor unit 30, and the like, based on a value detected by the vehicle height sensor 70, and controls an expansion/contraction operation of each of the air springs 12 (12FR, 12FL, 12RR, 12RL). For example, in a case where the amount of cargo of a vehicle or the number of occupants changes, the vehicle height changes depending on a weight thereof, but by controlling an expansion/contraction state of the air spring 12, a vehicle height of the vehicle can be controlled to an approximately constant height. In addition, the air spring 12 can change the vehicle height depending on a speed of the vehicle, and a stable travel according to the vehicle speed can be realized. Furthermore, the air spring 12 can lower the vehicle height when an occupant boards or alights, can adjust a height of a load platform for loading or unloading cargo, and thereby, the boarding/alighting operation and the loading/unloading operation can be easily performed. In addition, in a case where there are unevenness (for example, rock, curb, dent, or the like) on the road surface, the air spring 12 appropriately changes a vehicle height at each wheel, and thereby, it is possible to avoid that the vehicle is extremely tilted or travel cannot be made because the bottom of a vehicle body comes into contact with the road surface. Furthermore, by expanding the air spring 12 on the outer side of turn during turn travel, the vehicle can be tilted such that an inner side of turn is lowered, and thereby a posture can be suitable for turn travel.

The vehicle wheel speed sensors 72 (72a, 72b, 72c, 72d) are provided in each wheel and can detect a rotation amount of each wheel or a rotation number per unit time, and output the number of wheel speed pulses indicating the detected rotation number as a detection value. The vehicle height adjustment ECU 62 calculates a speed or a movement distance of the vehicle, based on the detection value acquired from the vehicle wheel speed sensors 72, and performs various controls. In a case of calculating the speed of the vehicle based on the detection values of the vehicle wheel speed sensors 72 (72a, 72b, 72c, 72d), the vehicle height adjustment ECU 62 determines the speed of the vehicle based on the wheel speed of the smallest detection value among the four wheels, and performs various controls. In addition, in a case where there is a wheel with the larger detection value than the other wheels among the four wheels, for example, in a case where there are wheels having the rotation number of a unit period (unit time or unit distance) more than or equal to a predetermined number than rotation numbers of the other wheels, it is assumed that the wheel is in a slipping state (idle state) and the vehicle height adjustment ECU 62 performs various controls.

The vehicle height adjustment system 10 according to the present embodiment includes two acceleration sensors 74 (74a, 74b). The acceleration sensor 74a is, for example, a sensor that detects acceleration in a left-right direction of the vehicle, and the acceleration sensor 74b is, for example, a sensor that detects acceleration in a front-rear direction of the vehicle. The vehicle height adjustment ECU 62 calculates a tilt (roll angle) in the left-right direction and a tilt (pitch angle) in the front-rear direction of the vehicle, based on the detection values of the acceleration sensors 74a and 74b.

The steering angle sensor 76 is, for example, a sensor for detecting a steering amount of a steering wheel. The vehicle height adjustment ECU 62 acquires the steering amount and a steering direction of the steering performed by a driver from the steering angle sensor 76 and performs various controls. In the above description, the calculation based on the detection values of the various sensors is performed by the vehicle height adjustment ECU 62 for the sake of convenience, but the embodiment is not limited to this. For example, other ECUs may perform the calculation depending on a type of the sensor and use of the detection value.

Figure 2:
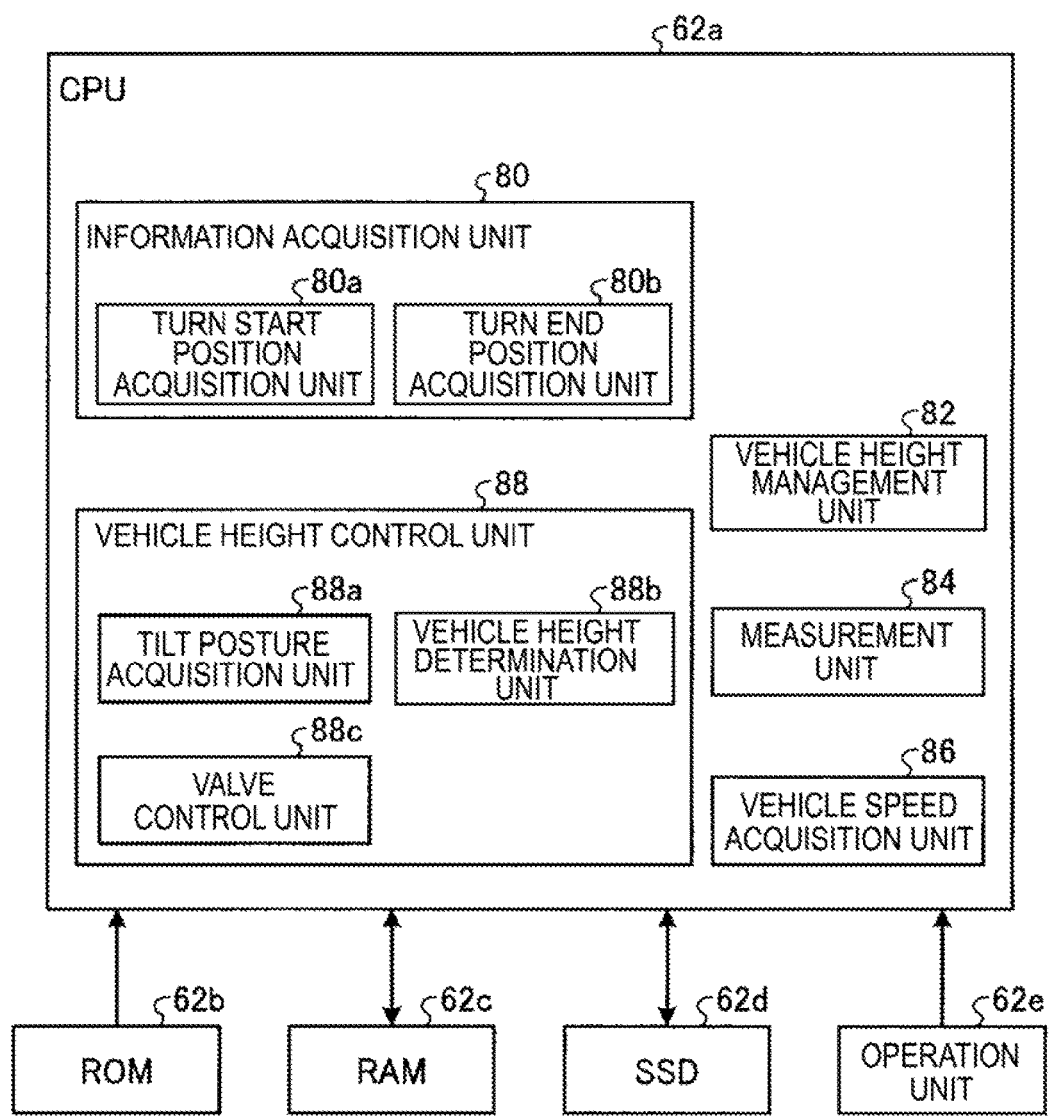
FIG. 2 is a block diagram illustrating an example of a module realized by a CPU of a vehicle height adjustment ECU of the vehicle height adjustment device according to the embodiment.

As illustrated in FIG. 2, the CPU 62a included in the vehicle height adjustment ECU 62 includes an information acquisition unit 80, a vehicle height management unit 82, a measurement unit 84, a vehicle speed acquisition unit 86, a vehicle height control unit 88, and the like so as to automatically realize an optimal tilt posture during the turn travel of the vehicle. In addition, the information acquisition unit 80 includes a turn start position acquisition unit 80a, a turn end position acquisition unit 80b, and the like. The vehicle height control unit 88 includes a tilt posture acquisition unit 88a, a vehicle height determination unit 88b, a valve control unit 88c, and the like.

The information acquisition unit 80 acquires turn route information during travel of the vehicle. For example, the map information can be used to acquire the turn route information. The information acquisition unit 80 acquires current position information of a host vehicle acquired by the navigation ECU 64 through the GPS reception unit 64e, and the map information held by the SSD 64d, and acquires a shape (a linear shape, a size, a curvature, a length of a curved section, and the like) of a road on which the host vehicle is expected to travel therefrom. In addition, the turn start position acquisition unit 80a acquires a turn start position on the route from the map information, in a case where existence of a road on which the turn travel is required is detected ahead of a travel route from the current position information of the host vehicle, for example, ahead of the route whose route guidance is made by the navigation ECU 64. In the same manner, the turn end position acquisition unit 80b acquires a turn end position at which turn travel is considered to end ahead of the travel route, for example, ahead of the route whose route guidance is made from the map information, when the turn start position is obtained by the turn start position acquisition unit 80a or at timing before the turn travel ends thereafter.

In another embodiment, the information acquisition unit 80 can acquire the turn route information, that is, a shape of a road using the image information based on the captured image data acquired by the display ECU 66 from the image capturing unit 66g. The CPU 66a of the display ECU 66 performs, for example, well-known white line recognition processing and the like with respect to the image based on the captured image data captured by the image capturing unit 66g to detect a center line, a roadway outside line, or the like. The information acquisition unit 80 acquires white line detection information and acquires the shape (a linear shape, a size, a curvature, a length of a curved section, and the like) of the road, based on information of the detected white line. In addition, the turn start position acquisition unit 80a acquires the shape (turn route) of the road ahead of the host vehicle, compares the degree of curvature of the white line with a threshold held in advance in the SSD 62d and the like, and acquires a start position of the curvature as the turn start position (control start position) in a case where the degree of curvature is larger than or equal to the threshold. In the same manner, in a case where it is considered that a curvature state of the white line recognized during the turn travel is removed on the basis of comparison with the threshold, the turn end position acquisition unit 80b sets the removed position as the turn end position (control end position). Acquisition of the turn route information is not limited to acquisition by white line detection, and can be made by various image processing. For example, the curvature state may be detected by detecting a shape of the road, or the curvature state may be detected by detecting a road sign indicating a shape of a front road.

In a case where the control start position or the control end position is acquired by using a current position of the host vehicle based on the GPS signal and the map information, the control start position or the control end position can be acquired at faster timing compared with a case of using the image processing based on the captured image data. As a result, it is possible to give a margin to calculation time in the vehicle height control unit 88, and to reduce a processing load of the CPU 62a. In addition, although performance of a CPU decreases, the same processing can be performed, and cost of components can be reduced. In addition, in another example, the information acquisition unit 80 may perform both acquisition of the turn route information based on the current position information and the map information and acquisition of the turn route information made by image processing of an image based on the captured image data. In this case, it is possible to further increase accuracy of a control start position or a control end position.

The vehicle height management unit 82 acquires current vehicle heights of each wheel on the basis of the detection value from the vehicle height sensor 70, and provides the acquired current vehicle heights to the vehicle height control unit 88.

The measurement unit 84 measures a period, for example, time after the turn travel is performed and the vehicle height control unit 88 starts the vehicle height adjustment for setting the host vehicle in a tilt posture. That is, the measurement unit measures the time when the host vehicle passes through the turn start position acquired by the turn start position acquisition unit 80a. For example, in a case where the vehicle height adjustment for realizing the tilt posture at the time of turn travel is made, it is possible to determine whether or not the tilt posture is realized (end of vehicle height control) depending on whether or not the vehicle heights of each wheel reach a target vehicle height, as an example. However, in this case, there is a case where it takes time to converge the expansion and contraction of the air spring 12 after the height of the vehicle changes, depending on a situation (for example, a slight uneven state) of the road surface. As a result, the vehicle height control may not be completed. The vehicle height control in this case can be regarded as a fine adjustment after the vehicle height control for realizing the tilt posture at the time of turn travel is schematically completed. Hence, in addition to detecting whether or not the vehicle height reaches a target vehicle height for realizing the tilt posture, time after the vehicle height adjustment for realizing the tilt posture starts is measured, and in a case where a predetermined time (predetermined period) elapses, it is regarded that a desired tilt posture is realized, and the vehicle height control ends. By providing the two determination references of vehicle height control end, it is possible to avoid continuing excessive control. For example, it is possible to avoid abnormality in which the vehicle height control does not end forever. A predetermined period for ending the vehicle height control can be determined in advance on the basis of the expansion/contraction control speed of the air spring 12, and, for example, it is possible to set time necessary for the air spring 12 to change from a shortest state to a longest state, for example, the time can be set to 5 seconds.

The vehicle speed acquisition unit 86 acquires a current speed of the host vehicle on the basis of the detection values of each of the vehicle wheel speed sensors 72. The vehicle height control according to the present embodiment is mainly performed for the purpose of improving travel stability during turn travel and improving drive feeling. At this time, in a case where a speed of the host vehicle is slow, for example, in a case where the speed is less than 30 km/h, it is considered that there is a low possibility of a decrease in travel stability or a decrease in drive feeling which may cause the passenger to feel a sense of incompatibility due to the turn travel even in a case where the turn travel is performed at the same speed. In a case where the vehicle height control is excessively performed at a scene where a passenger does not feel necessity so much, an operation sound of a valve and an operation sound of the air spring 12 may also give the passenger another sense of incompatibility. Hence, in a case where the vehicle speed acquired by the vehicle speed acquisition unit 86 is less than the predetermined speed, the vehicle height control unit 88 does not perform the vehicle height control for setting the vehicle to be in the tilt posture during travel, and thereby it is possible to avoid excessive control and to avoid a sense of incompatibility due to excessive control.

In a case where the host vehicle performs the turn travel, the tilt posture acquisition unit 88a acquires the tilt posture (tilt angle of the host vehicle) based on the information acquired by the information acquisition unit 80. For example, a relationship between a shape (a linear shape, a size, a curvature, a length of curved section, and the like) of the road and the tilt posture of the vehicle that can optimally travel during turn is determined in advance by testing or the like, and is held in a storage device such as the SSD 62d. The tilt posture acquisition unit 88a refers to the SSD 62d and acquires the optimal tilt posture at the time of turn travel corresponding to the shape of the road acquired by the information acquisition unit 80.

The vehicle height determination unit 88b determines the vehicle height at each wheel for realizing the tilt posture, based on the current vehicle height at each wheel acquired by the vehicle height management unit 82 and the tilt posture acquired by the tilt posture acquisition unit 88a. For example, the vehicle height determination unit 88b expands the air springs 12 on the front and rear sides of the turn outer wheel side to tilt the vehicle. For example, in a case where a shape of the road is curved right, the vehicle height determination unit 88*b* determines the amount of expansion (vehicle height) of the air springs 12FL and 12RL on the turn outer side on the basis of an expansion state of the air springs 12FR and 12RR. The air spring 12 can perform the vehicle height adjustment more quickly in a case where the air is supplied and expanded rather than being discharged and contracted, and can widen a vehicle height adjustment range by maintaining a state of the air spring 12 on the turn inner side and controlling the air spring 12 on the turn outer side. In a case where the tilt posture to be realized is large, for example, the air spring 12 on the turn outer side needs to be expanded, control time increases, or it may be impossible to realize a required tilt posture with a range of change from the current expansion state. In this case, the air spring 12 on the turn inner side may be shortened at the same time as expanding the air spring 12 on the turn outer side so as to achieve the required tilt posture.

The valve control unit 88*c* determines timing or a control period when opening/closing controls of each valve are performed, and controls each valve, such that the expansion state of each air spring 12 determined by the vehicle height determination unit 88*b* is realized.

Figure 3:
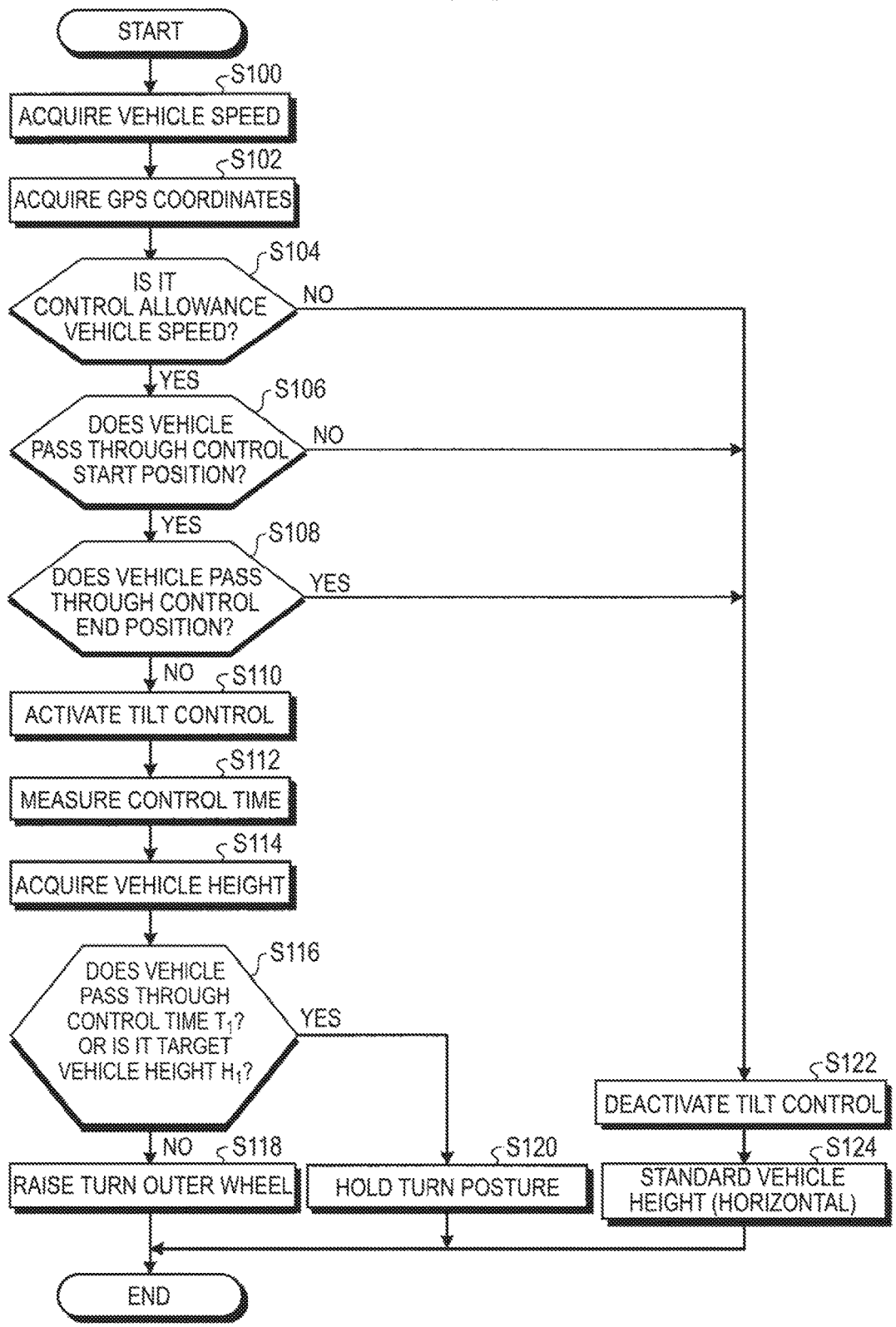
FIG. 3 is a flowchart illustrating an example of a vehicle height adjustment processing sequence performed by the vehicle height adjustment device according to the embodiment.
Figure 4:
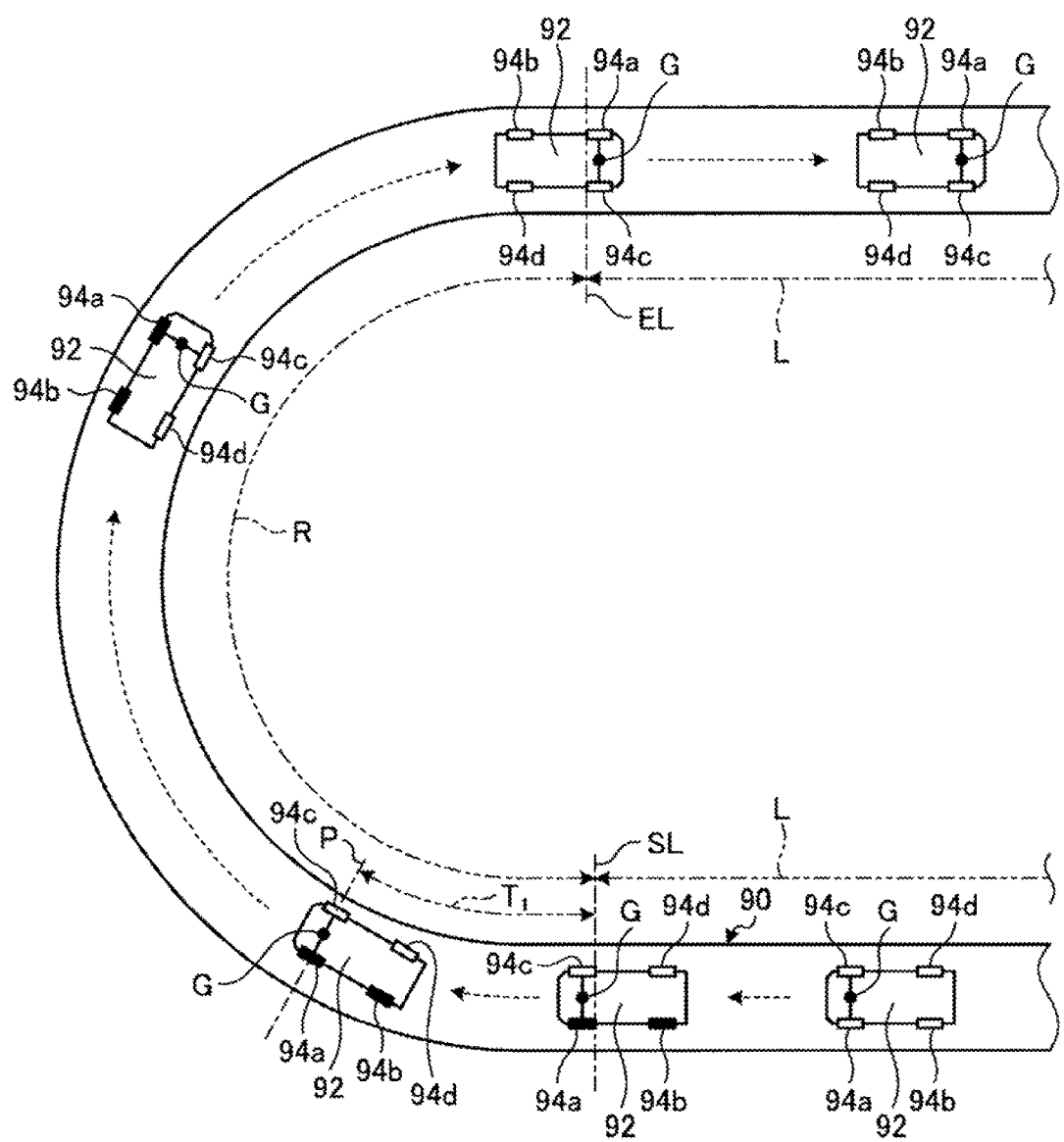
FIG. 4 is a view illustrating an example of a vehicle height control state in a case where a vehicle in which the vehicle height adjustment device according to the embodiment is mounted, travels a travel route including a non-turn region and a turn region.

An example of the vehicle height control, which is performed by the vehicle height adjustment system 10 configured as described above, during the turn travel will be described by using a flowchart of FIG. 3 and a turn travel example of FIG. 4. In the description of FIG. 3 and FIG. 4, a case where the information acquisition unit 80 acquires GPS coordinates indicating a host vehicle position from the navigation ECU 64 and determines a start position and an end position of the vehicle height control will be described as an example. In addition, it is assumed that the flowchart illustrated in FIG. 3 is repeatedly performed in a predetermined control cycle.

The CPU 62*a* of the vehicle height adjustment ECU 62 continuously acquires a vehicle speed of the host vehicle through the vehicle speed acquisition unit 86 during travel of the vehicle (S100), and acquires GPS coordinates (GPS signal) indicating a host vehicle position through the navigation ECU 64 (S102). Subsequently, the CPU 62*a* confirms whether or not a current vehicle speed of the host vehicle is a vehicle speed (control allowance speed) allowing a vehicle height adjustment speed through the vehicle speed acquisition unit 86 (S104). In a case where the vehicle speed is less than, for example, 30 km/h, it is considered that there is a low possibility of a decrease in travel stability and a decrease in drive feeling which may cause a passenger to feel a sense of incompatibility due to the turn travel even in a case where the turn travel is performed at the same speed, as described above. Accordingly, the vehicle height control unit 88 is limited to only a case where the current vehicle speed is higher than or equal to a control allowance vehicle speed (for example, 30 km/h), and allows a vehicle height adjustment control at the time of travel to avoid a decrease of travel stability or a decrease of drive feeling (Yes in S104).

In a case where the vehicle speed is higher than or equal to the allowed speed of the vehicle height control, the vehicle height control unit 88 compares the current position information of the host vehicle acquired by the information acquisition unit 80 with the turn route information acquired by the turn start position acquisition unit 80*a*, that is, the turn start position (control start position) (S106). In a case where the host vehicle passes through the control start position (Yes in S106), the vehicle height control unit 88 compares the turn end position information (control end position) acquired by the turn end position acquisition unit 80*b* with the current position information of the host vehicle (S108).

In a case where the host vehicle does not pass through the control end position yet (No in S108), the vehicle height adjustment at the time of turn travel is performed, a tilt control for setting the tilt posture suitable for the turn travel is activated (S110), and the measurement unit 84 measures the elapsed time from the control start (S112). At this point, the tilt posture acquisition unit 88*a* acquires the tilt posture of the host vehicle based on a shape (a linear shape, a size, a curvature, a length of a curve section) of the road in a case of the turn travel, from the current position information of the host vehicle and the turn route information, that is, the map information held by the navigation ECU 64, and the vehicle height determination unit 88*b* acquires the vehicle height (control amount) of each wheel for realizing the tilt posture (S114).

The vehicle height control unit 88 acquires the control elapse time after the tilt control is activated through the measurement unit 84 and confirms whether or not a control time $T_1$ (predetermined control time) elapses. In addition, the vehicle height management unit 82 acquires the current vehicle heights of each wheel on the basis of the detection value from the vehicle height sensor 70, and confirms whether or not the vehicle height reaches a target vehicle height $H_1$ for realizing the tilt posture (S116). In a case where the control time $T_1$ does not elapse yet and the vehicle height does not reach the target vehicle height $H_1$ (No in S116), the vehicle height control unit 88 controls the valve control unit 88*c* to perform a vehicle height raise control on the turn outer side of the own vehicle such that the vehicle height at the wheel on the turn outer side of the host vehicle reaches the target vehicle height $H_1$ (S118). Then, this flow temporarily ends, and the processing is performed from S100 in the next control cycle.

Meanwhile, in a case where the control time $T_1$ elapses and the vehicle height reaches the target vehicle height $H_1$ in S116 (Yes in S116), the vehicle height control unit 88 holds the current vehicle height control state (S120). That is, the valve control unit 88*c* closes the respective valves so as to hold the turn posture (tilt posture), temporarily ends this flow, and performs the processing from S100 in the next control cycle.

FIG. 4 is a view illustrating an example of the vehicle height control state of each wheel 94 in a case where a vehicle 92 travels on a travel route 90 including a non-turn region L and a turn region R, and is a view for illustrating control contents of a CPU 62*a* in correspondence with the flowchart in FIG. 3. A vehicle height at each wheel 94 of the vehicle 92 which travels in the non-turn region L is a standard vehicle height, and the vehicle height control at the time of turn according to the present embodiment is in a state of being not performed. The standard vehicle height is a vehicle height suitable for a state of the road and is a preset vehicle height or a default vehicle height determined by a setting operation of a driver. The standard vehicle height may be prepared as a plurality of types, such as a first standard vehicle height suitable for traveling on a general road or the like, and a second standard vehicle height with a lower vehicle height than the first standard vehicle height suitable for traveling on a highway or the like.

In a case where the CPU 62*a* detects that the vehicle 92 travels at the limit allowance speed or higher in the non-turn region L (Yes in S104), and in a case where the vehicle 92 passes through a control start position SL (Yes in S106) and does not pass a control end position EL (No in S108), the CPU 62*a* starts the tilt control (S110). Whether or not the vehicle 92 passes through the control start position SL (control end position EL) can be determined, for example, depending on whether or not a vehicle reference position G (for example, a specified position of the wheels 94a and 94c (front wheels) on a vehicle axle) indicating a host vehicle position on map coordinates passes through the control start position SL (control end position EL). In a case where the vehicle 92 (vehicle reference position G) passes through the control start position SL, it is considered that the vehicle enters the turn region R, the CPU 62a increases the vehicle heights of the turn outer wheels (wheels 94a and 94b) and performs the vehicle height adjustment so as to realize the tilt posture acquired by the tilt posture acquisition unit 88a (S118). In this case, the raise control of the vehicle height is continued until the control time $T_1$ elapses and the vehicle 92 reaches the target vehicle height $H_1$ for realizing the tilt posture after the vehicle 92 passes the control start position SL (No in S116).

As such, when turn travel is performed, the tilt posture of the vehicle 92 is adjusted such that the turn inner wheel side is lowered by raising the vehicle height on the turn outer wheel side, and thereby, lateral force components of gravity face turn inner side. As a result, the lateral force components facing the turn inner side at the time of turning cancel a part of a width G (centrifugal force, lateral force) generated toward the turn outer side, influence of the width G is relieved, and drive feeling at the time of turning can be improved. In a case where the control according to the present embodiment is not performed, the vehicle height on a normal turn outer side is lowered at the time of turning such that the vehicle is tilted. In this case, the lateral force components of the gravity are generated so as to face the turn outer side and are added to the width G generated toward the turn outer side at the time of turning, and a larger width G (centrifugal force, lateral force) is generated. Meanwhile, by tilting the turn inner side such that the turn inner side is lowered by the control according to the present embodiment, it is possible to reduce a burden on a passenger on the basis of the width (and to improve the travel stability at the time of turn and drive feeling as compared with a case where control is not performed. In addition, during the turn (cornering), cornering force on the turn outer side peaks and the cornering force of an average of the inner and outer wheels tends to drop. Meanwhile, as in the present actual form, by positively forming a tilt posture in which the vehicle height on the turn outer side is higher than the vehicle height on the turn inner side during a turn, a load applied to an outer wheel is transferred to an inner wheel during turn. As a result, a load balance of the four wheels is improved, and cornering force can be prevented from decreasing, which lead to the vehicle stability and improvement of the vehicle stability.

In addition, in a case of the vehicle height adjustment system 10 according to the present embodiment, there is a possibility that the vehicle height at each wheel can be individually adjusted, and thereby, the turn inner side can be lowered and the tilt posture can be tilted forwardly during turn. At this time, since the vehicle posture is oriented in a turn direction, the self-aligning torque is reduced, and accordingly it is possible to reduce a steering angle and steering force of the steering at the time of turn and to reduce an operation burden of a driver.

In a case of the vehicle height adjustment system 10 according to the present embodiment, by preferentially performing raise of the vehicle height on the turn outer wheel side with respect to the vehicle height adjustment on the turn inner wheel side, the vehicle height adjustment can be performed faster, and a vehicle height adjustment range can be widened.

In FIG. 4, the wheel 94 which is a target of the vehicle height adjustment for realizing the tilt posture during turn travel is denoted by black painting. In a case where the control time $T_1$ elapses or the vehicle height reaches the target vehicle height $H_1$ (Yes in S116), the valve control unit 88c closes each valve so as to maintain a vehicle height state at that time point. That is, in a case where the control time $T_1$ elapses or in a case where the vehicle height reaches the target vehicle height $H_1$, the vehicle height control for realizing the tilt posture at the time of turn travel is not performed, and excessive fine adjustment of the vehicle height due to a slight uneven state of a road surface or the like is not performed, and the drive feeling at the time of turn is improved, after that.

Returning to the flowchart of FIG. 3, in 8108, the vehicle height control unit 88 compares the turn end position acquired by the turn end position acquisition unit 80b with the current position information of the host vehicle (vehicle 92), and in a case where it is regarded that the host vehicle passes through the control end position (Yes in S108), the vehicle height control unit 88 deactivates the tilt control at the time of turn travel (S122), and returns the vehicle height at each wheel 94 to a state before entering the turn region R, that is, returns the vehicle height to the standard vehicle height (S124), and this flow temporarily ends. In this case, for example, an expansion/contraction state of the air spring 12 on the turn outer wheel side is controlled to match an expansion/contraction state of the air spring 12 on the turn inner wheel side, and the processing from S100 is continuously performed at the time of next control cycle. As a result, the vehicle height of the vehicle 92 is controlled to be a horizontal vehicle height suitable for traveling in the non-turn region L. In addition, in processing of S106, in a case where the host vehicle does not pass through the control start position (No in S106), the processing proceeds to S122 and the tilt control is deactivated. In the same manner, in the processing of S104, in a case where the current vehicle speed of the host vehicle is less than the vehicle speed (control allowance speed) allowing the vehicle height adjustment speed at the time of travel (No in S104), for example, in a case where the current vehicle speed is less than 30 km/h, the processing proceeds to S122 and the tilt control is deactivated.

As illustrated in FIG. 4, in a case where the vehicle height control unit 88 confirms that the vehicle 92 which performs the turn travel in a state where the vehicle height on the turn outer wheel side is raised passes through the control end position EL (Yes in S108), that is, in a case where the vehicle reference position G of the vehicle 92 passes through the control end position EL, the vehicle height control unit 88 deactivates the tilt control (S122), and returns the vehicle height at the turn outer wheel raised up until now to, for example, a state prior to the control (S124). As a result, the vehicle 92 can continuously travel at a vehicle height suitable for traveling on a road in the non-turn region L.

As such, in a case where a vehicle performs the turn travel, it is possible for the vehicle to take a tilt posture in which the vehicle height on the turn inner side is relatively low by raising the vehicle height at the wheel on the turn outer side, and thereby, influence of the width G (centrifugal force) generated on the turn outer side is relieved during a turn, and the drive feeling can be improved during the turn. In addition, a load applied to an outer wheel is transferred to an inner wheel by the tilt posture during the turn, and thus, a load balance of the four wheels is improved, and cornering force can be prevented from decreasing, which lead to the vehicle stability and improvement of the vehicle stability. In addition, by individually adjusting the vehicle height at each wheel, the turn inner side can be lowered and the tilt posture can be tilted forward. As a result, self-aligning torque can be reduced, a steering angle and steering force of the steering at the time of turn operation can be reduced, and an operation burden of a driver can be reduced. In addition, in a case where vehicle height adjustment is performed, air stored in the pressure tank 26 is used, and thus, expansion and contraction of the air spring 12 can be performed rapidly. As a result, it is possible to rapidly realize the tilt posture at the time of turn travel, and to rapidly improve the travel stability and drive feeling. In addition, since the air stored in the pressure tank 26 is used, a degree of freedom of extension and contraction widths of the air spring 12, that is, a degree of freedom of a tilt angle of the tilt posture is improved, it is possible to cope with various turn routes, and to easily realize improvement of the travel stability and improvement of the drive feeling. In addition, since the vehicle height adjustment system 10 according to the present embodiment is a system which uses an air pressure, a resin pipe can be used as a pipe of working fluid, which can contribute to reduction of system cost or reduction of a system weight.

In the aforementioned embodiment, the measurement unit 84 is an example of measurement of a period after the vehicle height adjustment starts, and an example in which time is measured is described, but, for example, although a movement distance (a position of a predetermined distance P) is measured after the vehicle height adjustment starts, the same effects can be obtained.

In addition, in the aforementioned embodiment, an example is described in which an expansion/contraction control of the air spring 12 is performed by using the compressed air stored in the pressure tank 26, but in a case where a control speed can be secured, for example, the pressure tank 26 may be omitted, and outer air is taken in by using the compressor unit 30 so as to perform the vehicle height adjustment, that is, a so-called open type system is used, and even if doing so, the same effects can be obtained.

A vehicle height adjustment device according to an aspect of this disclosure includes, for example, a pressure tank capable of storing air in a compression state; a plurality of vehicle height adjustment units that are provided in correspondence with wheels of a vehicle and individually adjust vehicle heights at the respective wheels by supplying the air from the pressure tank or returning the air to the pressure tank; an information acquisition unit that acquires turn route information during travel of the vehicle; and a control unit that raises the vehicle height at the vehicle height adjustment unit on a turn outer side more than the vehicle height at the vehicle height adjustment unit on a turn inner side such that the vehicle takes a tilt posture on the basis of the turn route information when the vehicle turns. According to this configuration, for example, vehicle height adjustments can be quickly and individually realized by air stored in a pressure tank at a vehicle height adjustment unit of each wheel, and a tilt posture in which a vehicle height on a turn outer side is higher than a vehicle height on a turn inner side, that is, a tilt posture of a vehicle in which the turn inner side is lowered can be quickly realized. As a result, influence of a width G (centrifugal force) generated toward the turn outer side is relieved at the time of a turn, and travel stability at the time of a turn and drive feeling can be improved. In addition, since a load applied to the outer wheel is transferred to an inner wheel at the time of a turn by the tilt posture, a load balance of four wheels is improved, and cornering force can be prevented from decreasing, which lead to vehicle stability and improvement of the vehicle stability. In addition, by individually adjusting the vehicle heights of each wheel, the turn inner side can be lowered and the tilt posture can be tilted forward. As a result, a self-aligning torque can be reduced, a steering angle and steering force of the steering can be reduced at the time of a turn operation, and an operation burden of a driver can be reduced.

The information acquisition unit of the vehicle height adjustment device according to the aspect of this disclosure may acquire, for example, a turn start position and a turn end position of the vehicle. According to this configuration, for example, it is possible to change a vehicle to a tilt posture suitable for a turn travel at an appropriate timing, and to return the vehicle to an original posture, for example, to a horizontal posture at an appropriate timing. As a result, it is possible to improve travel stability according to a shape of a travel route, and to improve drive feeling.

The information acquisition unit of the vehicle height adjustment device according to the aspect of this disclosure may acquire the turn route information by using map information.

A vehicle height adjustment device according to another aspect of this disclosure includes, for example, a plurality of vehicle height adjustment units that are provided in correspondence with wheels of a vehicle and individually adjust vehicle heights at the respective wheels; an information acquisition unit that acquires current position information of the vehicle; a storage unit that holds a position on a map when the vehicle turns and a tilt posture of the vehicle in the position in association with each other; and a control unit that acquires the tilt posture corresponding to the current position information from the storage unit when the vehicle turns and raises a vehicle height at the vehicle height adjustment unit on a turn outer side more than a vehicle height at the vehicle height adjustment unit on a turn inner side such that the vehicle takes the tilt posture. According to this configuration, for example, vehicle height adjustment is individually performed in each wheel so as to realize a tilt posture corresponding to a position on the map when the vehicle turns, and a tilt posture in which a vehicle height on a turn outer side is higher than a vehicle height on a turn inner side, that is, a tilt posture of a vehicle in which the turn inner side is lowered can be quickly realized. As a result, influence of a width G (centrifugal force) generated toward the turn outer side is relieved at the time of a turn, and travel stability at the time of a turn and drive feeling can be improved. In addition, since a load applied to the outer wheel is transferred to an inner wheel at the time of a turn by the tilt posture, a load balance of four wheels is improved, and cornering force can be prevented from decreasing, which lead to vehicle stability and improvement of the vehicle stability. In addition, by individually adjusting the vehicle heights of each wheel, the turn inner side can be lowered and the tilt posture can be tilted forward. As a result, a self-aligning torque can be reduced, a steering angle and steering force of the steering can be reduced at the time of a turn operation, and an operation burden of a driver can be reduced.

The control unit of the vehicle height adjustment device according to the aspect of this disclosure may raise a vehicle height at the vehicle height adjustment unit on a turn outer side, among the plurality of vehicle height adjustment units, more than a vehicle height at the vehicle height adjustment unit on a turn inner side, such that the tilt posture is taken. According to this configuration, in a case where a vehicle height is raised, vehicle height adjustment can be performed more quickly and the vehicle height adjustment range can be widened as compared with a case where the vehicle height is lowered. As a result, a more accurate tilt posture of a vehicle can be obtained.

The control unit of the vehicle height adjustment device according to the aspect of this disclosure may raise a vehicle height at the vehicle height adjustment unit on a turn outer side, among the plurality of vehicle height adjustment units, more than a standard vehicle height at the time of a non-turn, and maintains a vehicle height at the vehicle height adjustment unit on a turn inner side as the standard vehicle height at the time of the non-turn such that vehicle takes the tilt posture.

The control unit of the vehicle height adjustment device according to the aspect of this disclosure may end vehicle height adjustment of the vehicle during a turn in a case where the vehicle reaches the tilt posture, and may maintain the tilt posture according to the vehicle height. According to this configuration, for example, in a case where a vehicle height reaches a vehicle height for realizing a tilt posture corresponding to a turn route of a road surface, the vehicle height is fixed in that state. As a result, the vehicle can reliably realize the tilt posture corresponding to the turn route, and after the tilt posture can be realized, it is possible to avoid excessive fine adjustment of the vehicle due to a slight uneven state or the like of the road surface, and to improve drive feeling at the time of a turn.

The control unit of the vehicle height adjustment device according to the aspect of this disclosure may end vehicle height adjustment of the vehicle during a turn in a case where a predetermined period elapses after the vehicle height adjustment starts, and may maintain the tilt posture according to the vehicle height. According to this configuration, for example, in a case where a tilt posture corresponding to a turn route is realized, the vehicle height is fixed in that state after a predetermined period elapses. As a result, after the vehicle height control starts and a predetermined period elapses, excessive fine adjustment of a vehicle height due to a slight uneven state or the like of a road surface is avoided regardless of whether or not a desired tilt posture is realized. That is, regardless of a state of the road surface in the turn route, the vehicle height control ends at a fixed timing, and the drive feeling at the time of a turn can be improved.

The control unit of the vehicle height adjustment device according to the aspect of this disclosure may end vehicle height adjustment of the vehicle during a turn in a case where the vehicle moves a predetermined distance after the vehicle height adjustment starts, and maintains the tilt posture according to the vehicle height.

Although embodiments and modification examples are disclosed herein, those are presented as examples and are not intended to limit the scope disclosed herein. The novel embodiments can be practiced in various other forms, and various omissions, substitutions, and changes can be made in a range without departing from the gist disclosed herein. The embodiments and modification examples thereof are included in the scope and the gist disclosed herein, and are included in the scope of claims disclosed herein and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle height adjustment device comprising:
   a pressure tank capable of storing air in a compression state;
   a plurality of vehicle height adjustment units that are provided in correspondence with wheels of a vehicle and individually adjust vehicle heights at the wheels by supplying the air from the pressure tank or returning the air to the pressure tank;
   an information acquisition unit that acquires turn route information during travel of the vehicle; and
   a control unit that raises a vehicle height at a vehicle height adjustment unit of the plurality of vehicle height adjustment units on a turn outer side more than a vehicle height at a vehicle height adjustment unit of the plurality of vehicle height adjustment units on a turn inner side such that the vehicle takes a tilt posture on a basis of the turn route information when the vehicle turns.

2. The vehicle height adjustment device according to claim 1, wherein the information acquisition unit acquires a turn start position and a turn end position of the vehicle.

3. The vehicle height adjustment device according to claim 1, wherein the information acquisition unit acquires the turn route information by using map information.

4. The vehicle height adjustment device according to claim 1, wherein the control unit raises a vehicle height at the vehicle height adjustment unit on a turn outer side, among the plurality of vehicle height adjustment units, more than a vehicle height at the vehicle height adjustment unit on a turn inner side, such that the vehicle takes the tilt posture.

5. The vehicle height adjustment device according to claim 1, wherein the control unit raises a vehicle height at the vehicle height adjustment unit on a turn outer side, among the plurality of vehicle height adjustment units, more than a standard vehicle height at a time of a non-turn, and maintains a vehicle height at the vehicle height adjustment unit on a turn inner side as the standard vehicle height at the time of the non-turn such that vehicle takes the tilt posture.

6. The vehicle height adjustment device according to claim 1, wherein the control unit ends vehicle height adjustment of the vehicle during a turn in a case where the vehicle reaches the tilt posture, and maintains the tilt posture according to the vehicle height.

7. The vehicle height adjustment device according to claim 1, wherein the control unit ends vehicle height adjustment of the vehicle during a turn in a case where a predetermined period elapses after the vehicle height adjustment starts, and maintains the tilt posture according to the vehicle height.

8. The vehicle height adjustment device according to claim 1, wherein the control unit ends vehicle height adjustment of the vehicle during a turn in a case where the vehicle moves a predetermined distance after the vehicle height adjustment starts, and maintains the tilt posture according to the vehicle height.

9. A vehicle height adjustment device comprising:
   a plurality of vehicle height adjustment units that are provided in correspondence with wheels of a vehicle and individually adjust vehicle heights at the respective wheels;

an information acquisition unit that acquires current position information of the vehicle;

a storage unit that stores a position on a map where the vehicle turns and a tilt posture of the vehicle in the position in association with each other; and a control unit that acquires the tilt posture corresponding to the current position information from the storage unit when the vehicle turns, and raises a vehicle height at a vehicle height adjustment unit of the plurality of vehicle height adjustment units on a turn outer side more than a vehicle height at a vehicle height adjustment unit of the plurality of vehicle height adjustment units on a turn inner side such that the vehicle takes the tilt posture.

10. The vehicle height adjustment device according to claim 9, wherein the control unit raises a vehicle height at the vehicle height adjustment unit on a turn outer side, among the plurality of vehicle height adjustment units, more than a vehicle height at the vehicle height adjustment unit on a turn inner side, such that the vehicle takes the tilt posture.

11. The vehicle height adjustment device according to claim 9, wherein the control unit raises a vehicle height at the vehicle height adjustment unit on a turn outer side, among the plurality of vehicle height adjustment units, more than a standard vehicle height at a time of a non-turn, and maintains a vehicle height at the vehicle height adjustment unit on a turn inner side as the standard vehicle height at the time of the non-turn such that vehicle takes the tilt posture.

12. The vehicle height adjustment device according to claim 9, wherein the control unit ends vehicle height adjustment of the vehicle during a turn in a case where the vehicle reaches the tilt posture, and maintains the tilt posture according to the vehicle height.

13. The vehicle height adjustment device according to claim 9, wherein the control unit ends vehicle height adjustment of the vehicle during a turn in a case where a predetermined period elapses after the vehicle height adjustment starts, and maintains the tilt posture according to the vehicle height.

14. The vehicle height adjustment device according to claim 9, wherein the control unit ends vehicle height adjustment of the vehicle during a turn in a case where the vehicle moves a predetermined distance after the vehicle height adjustment starts, and maintains the tilt posture according to the vehicle height.

\* \* \* \* \*